(12) United States Patent
Swinderman

(10) Patent No.: US 6,439,373 B1
(45) Date of Patent: Aug. 27, 2002

(54) CONSTANT ANGLE AND PRESSURE CONVEYOR BELT CLEANER AND TENSIONING ARRANGEMENT

(75) Inventor: R. Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/428,956

(22) Filed: Nov. 4, 1999

Related U.S. Application Data
(60) Provisional application No. 60/107,606, filed on Nov. 9, 1998.

(51) Int. Cl.[7] ............................................. B65G 45/00
(52) U.S. Cl. ........................................ 198/499; 198/497
(58) Field of Search ................................. 198/497, 499

(56) References Cited

U.S. PATENT DOCUMENTS

| | | | |
|---|---|---|---|
| 2,398,821 A | 4/1946 | Davidson | |
| 3,160,266 A | 12/1964 | Edwards | |
| 3,629,814 A | * 12/1971 | Klein ........................ | 340/52 A |
| 3,795,308 A | 3/1974 | Oury | |
| 3,949,866 A | 4/1976 | Pott | |
| 3,961,704 A | 6/1976 | Rochester | |
| 4,202,437 A | * 5/1980 | Gordon ...................... | 198/497 |
| 4,249,650 A | 2/1981 | Stahura | |
| 4,258,840 A | * 3/1981 | Conkle ....................... | 198/502 |
| 4,359,150 A | 11/1982 | Bowman et al. | |
| 4,598,823 A | 7/1986 | Swinderman | |
| 4,658,949 A | 4/1987 | Reicks | |
| 4,768,644 A | * 9/1988 | Cromm ....................... | 198/499 |
| 4,917,231 A | 4/1990 | Swinderman | |
| 4,925,434 A | 5/1990 | Swinderman et al. | |
| 4,953,689 A | 9/1990 | Peterson et al. | |
| 4,958,719 A | 9/1990 | Hourticolon et al. | |
| 5,088,965 A | 2/1992 | Swinderman et al. | |
| 5,201,402 A | 4/1993 | Mott | |
| 5,222,589 A | * 6/1993 | Gordon ...................... | 198/497 |
| 5,518,107 A | * 5/1996 | Schwarze .................. | 198/499 |
| 5,622,249 A | 4/1997 | Morin | |
| 5,887,702 A | 3/1999 | Mott | |
| 6,003,657 A | * 12/1999 | Mott .......................... | 198/499 |
| 6,213,287 B1 | * 4/2001 | Juracko ..................... | 198/499 |
| 6,241,075 B1 | * 6/2001 | Krumscheil ............... | 198/499 |

FOREIGN PATENT DOCUMENTS

GB        618355        2/1949

* cited by examiner

*Primary Examiner*—Douglas Hess
(74) *Attorney, Agent, or Firm*—Lee, Mann, Smith McWilliams, Sweeney & Ohlson

(57) ABSTRACT

A conveyor belt cleaner and tensioning arrangement for cleaning a conveyor belt including a conveyor belt cleaner and a tensioner. The conveyor belt cleaner includes one or more scraper blades mounted on a rotatable cross shaft. The tensioner includes a mounting member attached to the cross shaft for conjoint rotation therewith, a resilient linear biasing member attached to the mounting member, and a linear actuator attached to the biasing member. Operation of the actuator member stores a biasing force within the biasing member which in turn rotates the scraper blades into full-face engagement with the conveyor belt with a biasing force. As the scraper blades wear the biasing member continues to rotate the scraper blades into full-face engagement with the conveyor belt with a biasing force that changes in magnitude. The scraper blades include a front surface and a rear surface which are configured and located with respect to one another to provide a blade face surface that extends therebetween having an area which changes as the scraper blades wear, in order to maintain a substantially constant contact pressure between the scraper blades and the conveyor belt as the scraper blades wear during use.

34 Claims, 8 Drawing Sheets

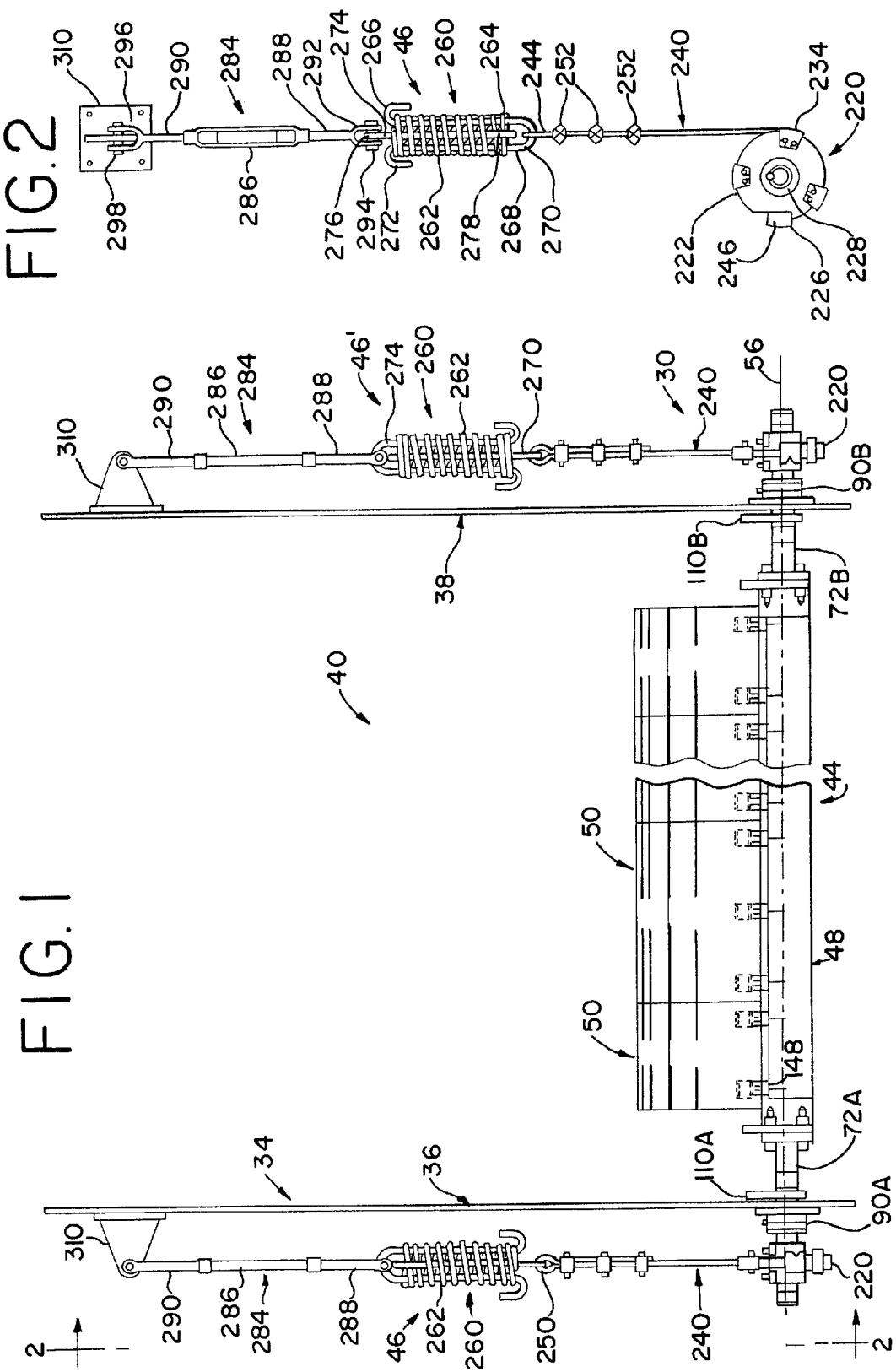
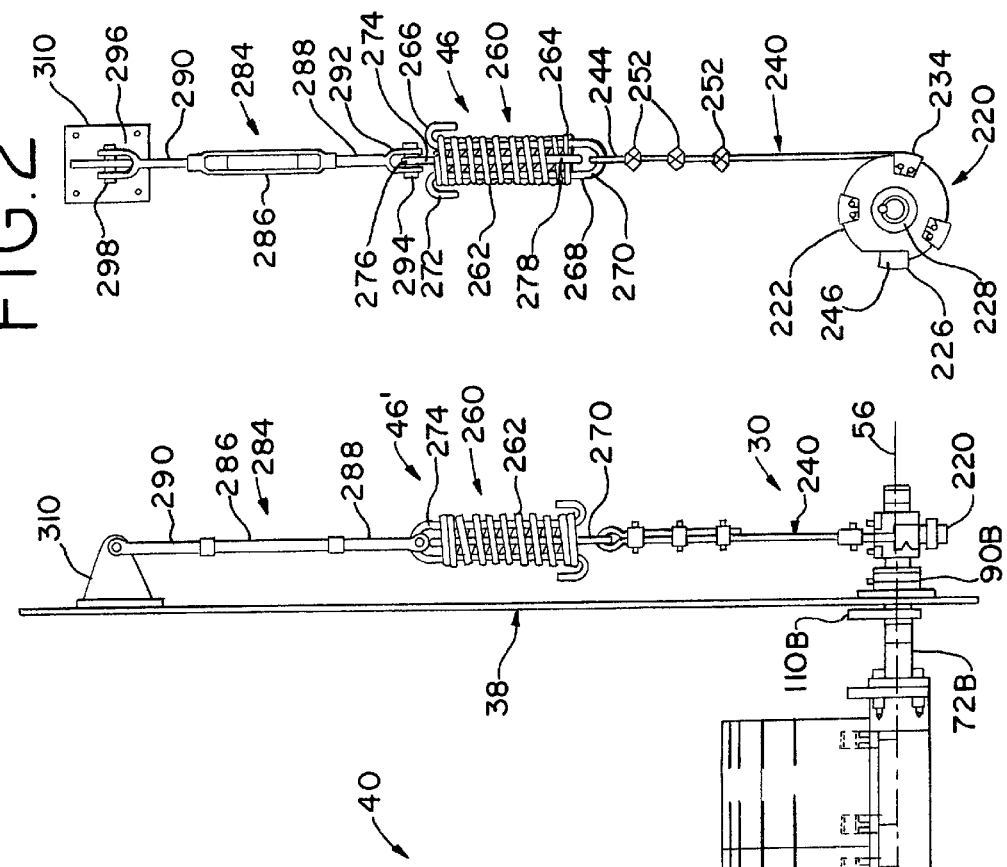

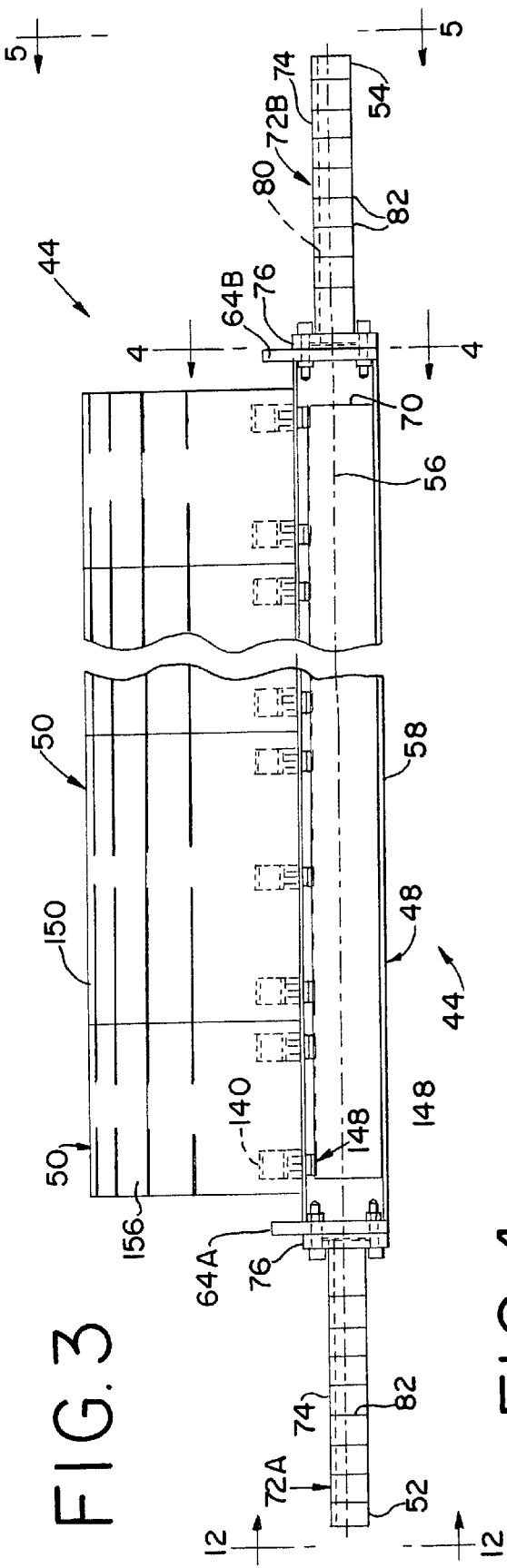
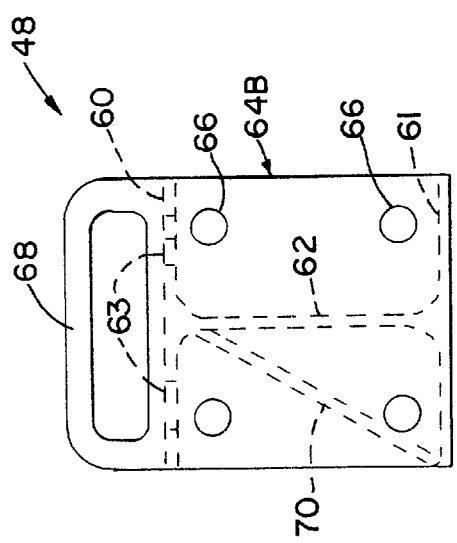
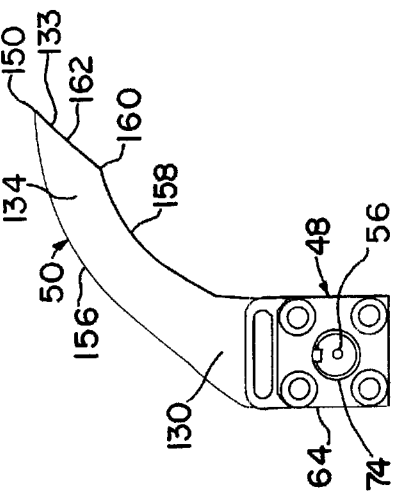
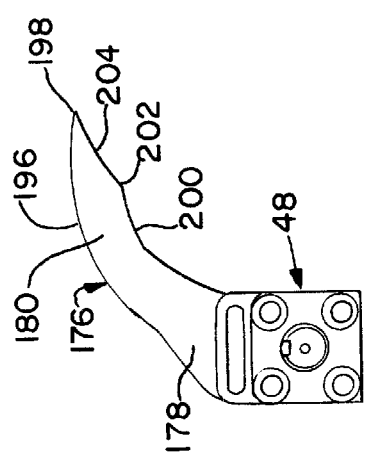

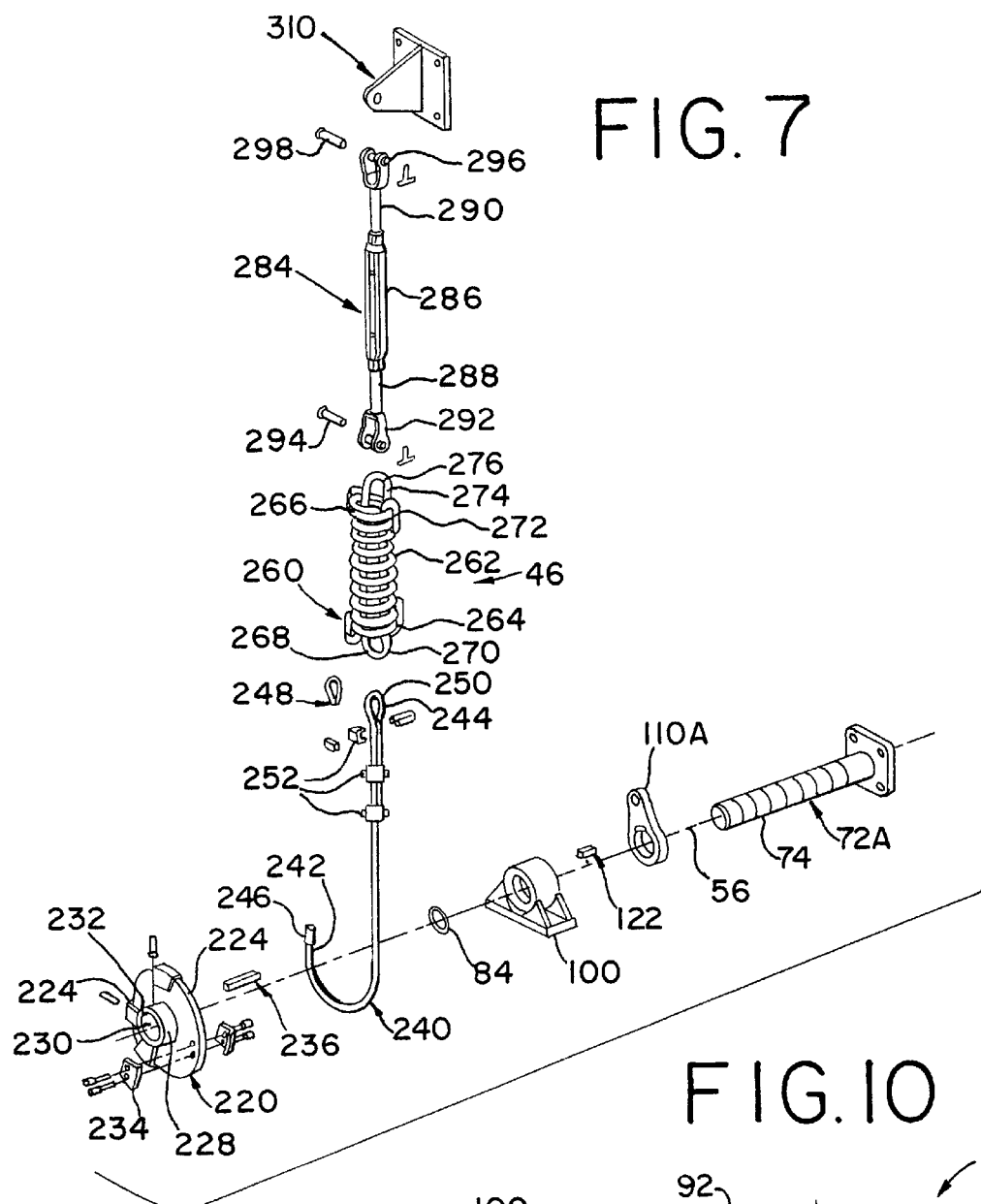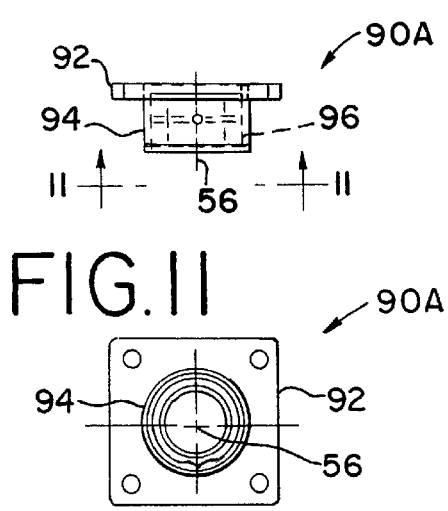

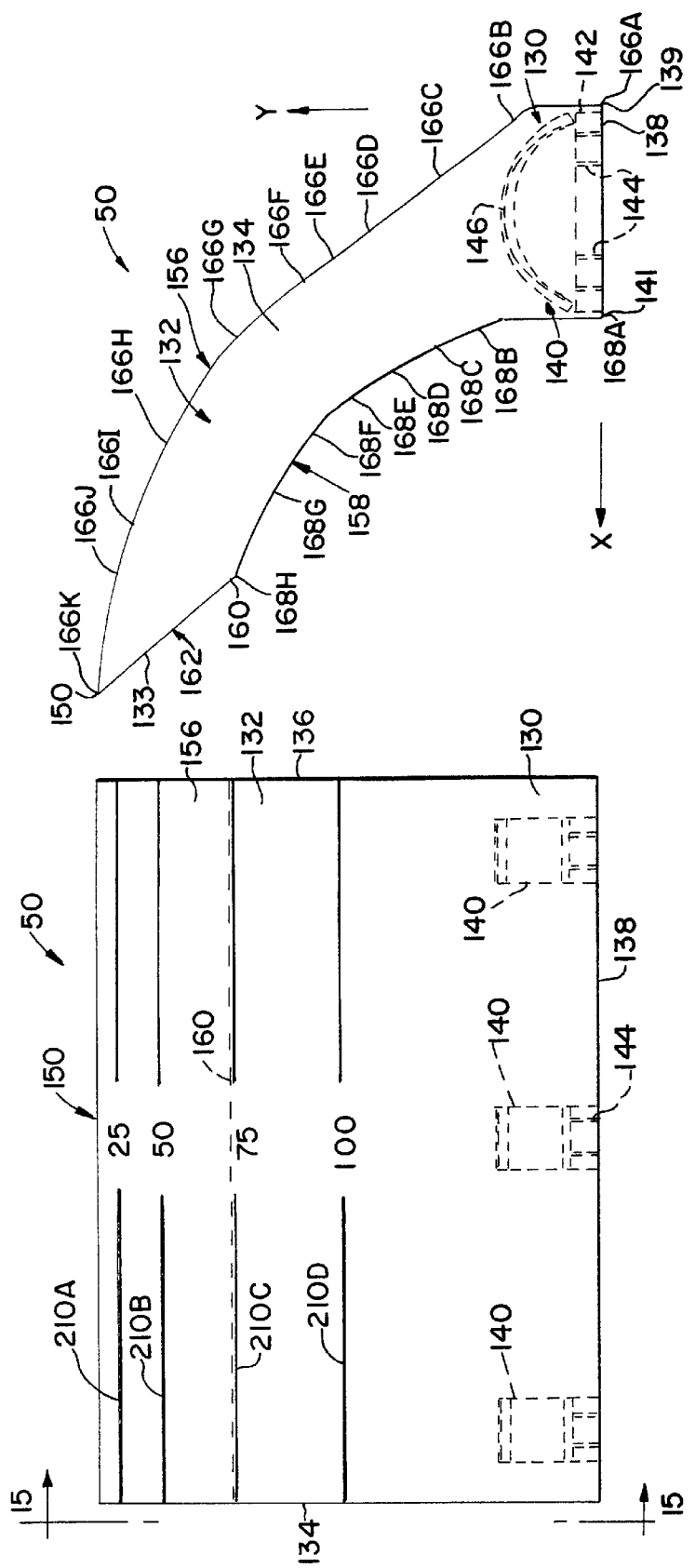

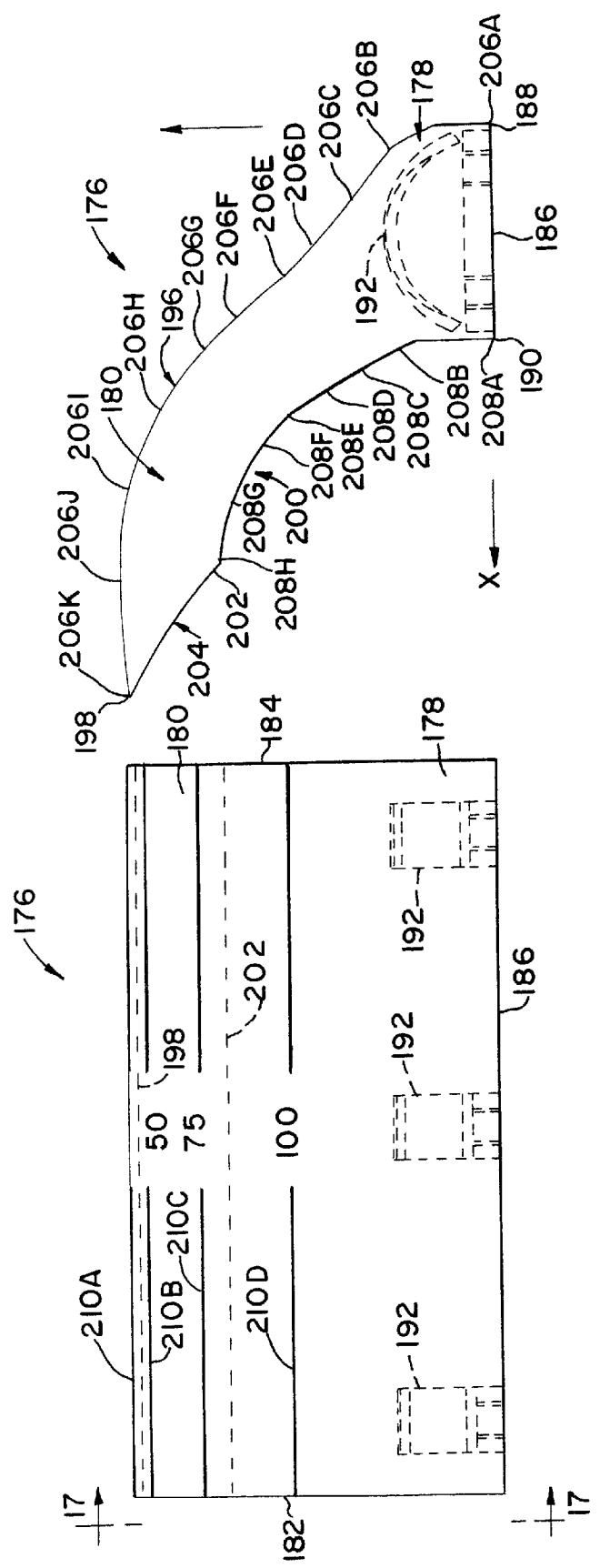

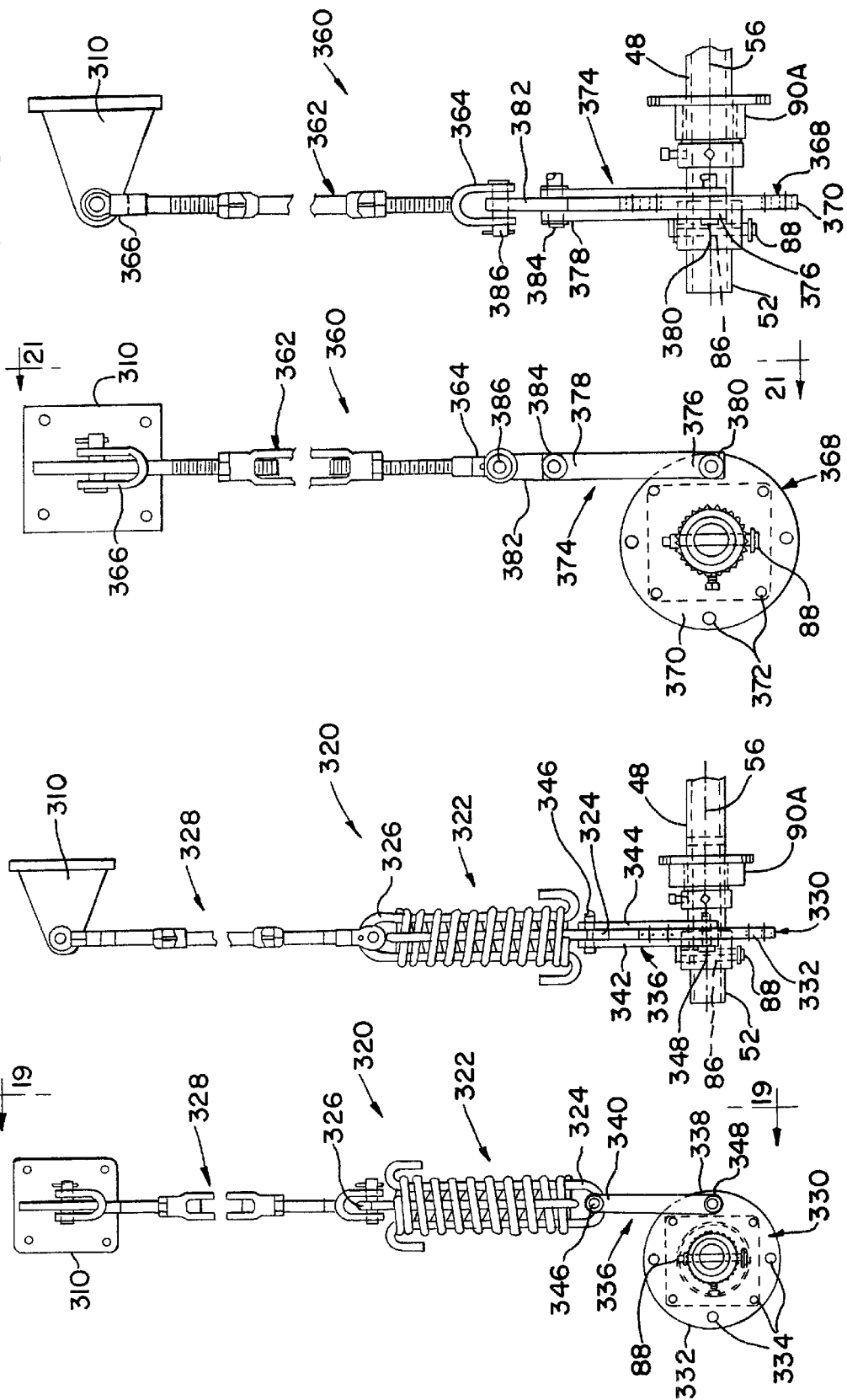

CONSTANT ANGLE AND PRESSURE CONVEYOR BELT CLEANER AND TENSIONING ARRANGEMENT

RELATED APPLICATIONS

This application claims the benefit of U.S. Provisional Application No. 60/107,606, filed Nov. 9, 1998.

BACKGROUND OF THE INVENTION

The present invention relates to a conveyor belt cleaner and tensioning arrangement, and in particular to a conveyor belt cleaner and tensioning arrangement wherein the scraper blades of the conveyor belt cleaner have a blade face which provides initial and subsequent full-face contact with the conveyor belt and wherein the scraper blades maintain a substantially constant cleaning angle with the surface of the conveyor belt and engage the conveyor belt with a substantially constant scraping pressure during the wear life of the scraper blades.

Conveyor mechanisms utilize an endless conveyor belt to transport bulk material, such as sand, gravel, coal and other bulk materials, from one location to another. Such a conveyor utilizes a rotating drum at each end of the moving belt. As the bulk material is discharged from the moving conveyor belt, a portion of the bulk material often remains adhered to the outer surface of the conveyor belt. Conveyor belt cleaners, including one or more scraper blades, are used to scrape the adherent material from the belt on its return run and thereby clean the belt. The scraper blades of a conveyor belt cleaner are removably attached to a rotatable cross shaft that extends transversely across the width of the conveyor belt. A tensioning device is attached to the cross shaft and applies a rotational biasing force to the cross shaft which in turn rotates the tips of the scraper blades into scraping engagement with the conveyor belt.

Scraper blades were previously made such that just the scraping edge of the blade face surface initially engaged the conveyor belt, rather than the entire or full blade face surface, when installed. This edge contact type of blade design cleans with high efficiency when new, but after the blade wears for a short period of time cleaning effectiveness is lost. Scraper blades that provide full-face contact between the face surface of the blade and the conveyor belt, such as those of the present invention, can be designed to maintain constant cleaning efficiency over their wear life. Full-face contact blades extend the life of the of the blade, particularly on high speed conveyors because a full-face contact blade has more mass to absorb the heat of friction generated with the rotating belt. Full-face blades also eliminate a problem known as feathering which occurs with primary cleaner blades when just the scraping edge engages the belt.

The present invention also enables a scraper blade to operate with a substantially constant cleaning angle and scraping pressure. The tips of primary scraper blades engage the curved surface of the conveyor belt at the head pulley of the conveyor and form a cleaning angle between the conveyor belt surface and the front surface of the scraper blade at the scraping edge of the front surface. The tip of each scraper blade also includes a scraping surface that engages the surface of the conveyor belt. The scraping surface engages the surface of the conveyor belt with a scraping pressure that is approximately equal to the scraping force with which the scraper blade engages the conveyor belt divided by the area of the scraping surface of the scraper blade.

During operation, the scraping edge and the scraping surface of each scraper blade wears due to its scraping engagement with the rotating conveyor belt. The tensioner rotates the cross shaft and the scraper blades to maintain the scraper blades in biased scraping engagement with the conveyor belt. As the scraper blades wear and are rotated into continuing engagement with the conveyor belt, the orientation of the scraper blades with respect to the conveyor belt changes, which typically causes a change in the cleaning angle between the surface of the conveyor belt and the front surface of the scraper blade at the scraping edge, and a change in the scraping pressure with which the scraper blade engages the conveyor belt. In order to maintain optimum cleaning of the surface of the conveyor belt, and to achieve maximum scraper blade life and performance, the cleaning angle between the scraper blades and the conveyor belt surface, and the scraping pressure with which the scraper blades engage the conveyor belt, should remain substantially constant during the wear life of the scraper blades as the scraper blades wear and are rotated into continuing engagement with the conveyor belt. One approach to partially solving this problem is shown in U.S. Pat. No. 4,917,231 owned by the applicant herein.

SUMMARY OF THE INVENTION

A conveyor belt cleaner and tensioning arrangement including a conveyor belt cleaner and a tensioner. The conveyor belt cleaner includes a cross shaft having a central axis. One or more scraper blades are mounted on the cross shaft. The cross shaft and the scraper blades are selectively rotatable about the central axis. The tensioner includes a mounting member attached to the cross shaft for conjoint rotation with the cross shaft. The tensioner also includes a resilient biasing member, such as a spring, and an actuator member, such as turnbuckle. The actuator member and the biasing member are operatively attached to one another. The actuator member and the biasing member operatively attach the mounting member to a stationary member.

Operation of the actuator member causes the conveyor belt cleaner cross shaft and the attached scraper blades to rotate about the central axis. Once the conveyor belt cleaner scraper blades are rotated into full-face scraping engagement with the conveyor belt, further operation of the actuator member changes the length of the biasing member and thereby stores a biasing force within the biasing member. As the scraper blades wear, the biasing member causes the cross shaft to rotate and thereby maintains the scraper blades in full face contact with the conveyor belt. The magnitude of the biasing force provided by the biasing member decreases as the scraper blades wear, and the distance between the central axis about which the scraper blades rotate and the tips of the scraper blades which engage the conveyor belt also decreases, thereby changing the force with which the scraper blades are biased into engagement with the conveyor belt. The area of the blade face scraping surface changes as the scraper blades wear to account for the change in the force with which the scraper blades are biased into engagement with the conveyor belt such that the contact pressure between the scraper blades and the conveyor belt remains substantially constant as the scraper blades wear and as the biasing member continues to rotate the scraper blades into engagement with the belt.

BRIEF DESCRIPTION OF THE DRAWING FIGURES

FIG. 1 is a partial front elevational view of the conveyor belt cleaner and tensioning arrangement of the present invention.

FIG. 2 is a side elevational view taken along lines 2—2 of FIG. 1.

FIG. 3 is a partial front elevational view of the conveyor belt cleaner of the present invention.

FIG. 4 is a cross sectional view taken along lines 4—4 of FIG. 3.

FIG. 5 is an end view taken along lines 5—5 of FIG. 3.

FIG. 6 shows an alternate scraper blade embodiment attached to the cross shaft of the conveyor belt cleaner.

FIG. 7 is an exploded view of the conveyor belt cleaner tensioner of the present invention.

FIG. 8 is a top plan view of a mounting bracket for the cross shaft.

FIG. 9 is side elevational view of the mounting bracket taken along lines 9—9 of FIG. 8.

FIG. 10 is a top plan view of an alternate embodiment of a mounting bracket for the cross shaft.

FIG. 11 is a front elevational view taken along lines 11—11 of FIG. 10.

FIG. 14 is a front elevational view of a scraper blade of the present invention.

FIG. 15 is a side elevational view taken along lines 15—15 of FIG. 14.

FIG. 16 is a front elevational view of another embodiment of the scraper blade of the present invention.

FIG. 17 is a side elevational view taken along lines 17—17 of FIG. 16.

FIG. 18 is a side elevational view of a modified embodiment of the conveyor belt cleaner tensioner.

FIG. 19 is a front elevational view taken along line 19—19 of FIG. 18.

FIG. 20 is a side elevational view of a further modified embodiment of the conveyor belt cleaner tensioner.

FIG. 21 is a front elevational view taken along line 21—21 of FIG. 20.

DETAILED DESCRIPTION OF THE PREFERRED EMBODIMENTS

Figure 13:
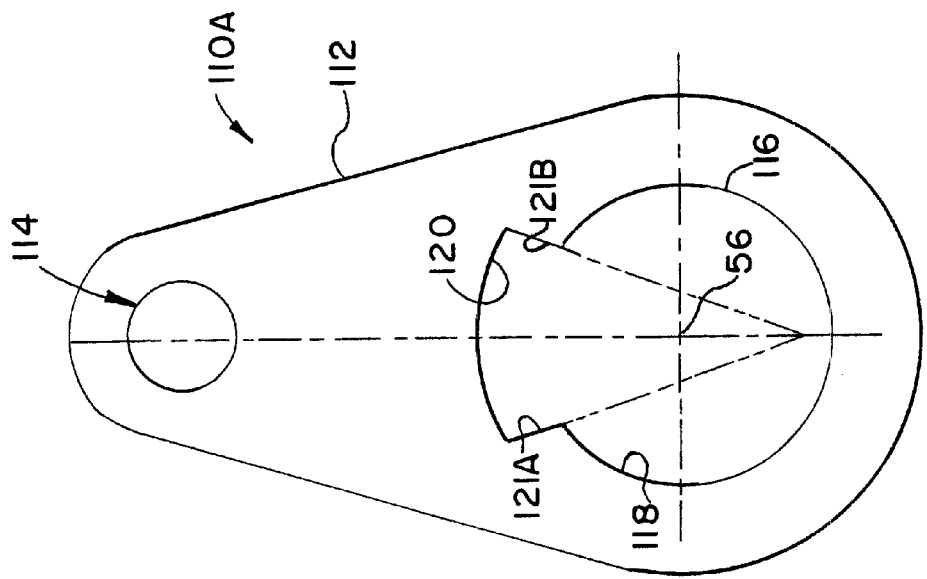
FIG. 13 is a side elevational view of a scraper blade stop member of the present invention.
Figure 12:
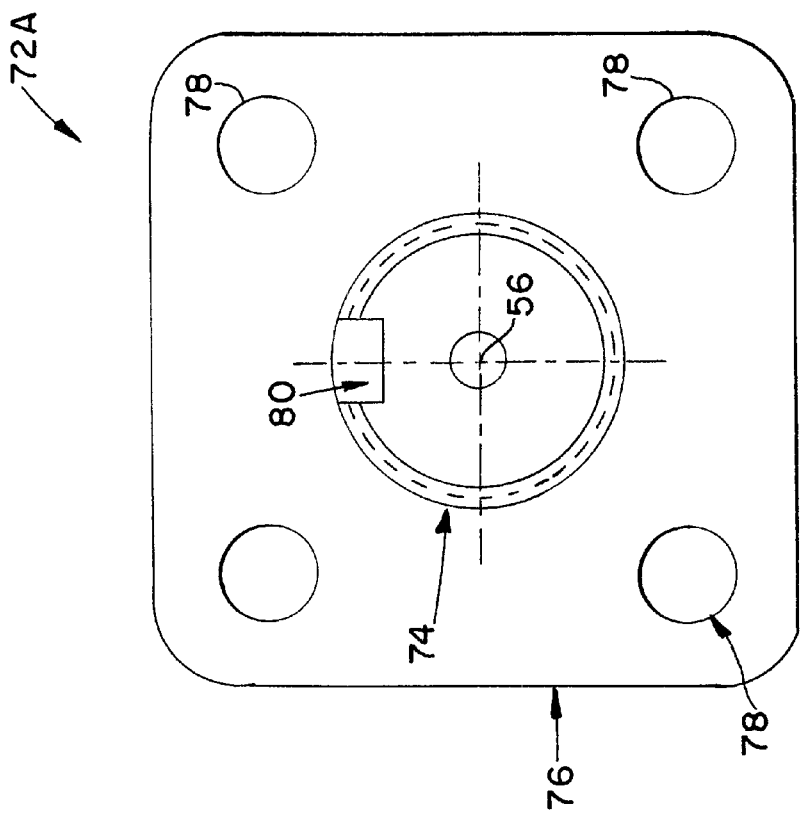
FIG. 12 is an end view taken along lines 12—12 of FIG. 3.

The conveyor belt cleaner and tensioning arrangement 30, as shown in FIGS. 1 and 18, is adapted for use in connection with a conveyor mechanism. The conveyor mechanism includes a rotatable endless conveyor belt 31 having an outer surface 32 that is adapted to transport bulk material. The bulk material is discharged from the conveyor belt 31 at a generally cylindrical head pulley 33 about which the conveyor belt 31 is partially wrapped. The rotatable head pulley 33 and the discharge end of the conveyor belt 31 are located within a conveyor chute 34 which forms part of the conveyor mechanism. The conveyor chute 34 includes a first chute wall 36 and a spaced apart and generally parallel second chute wall 38. The first and second chute walls 36 and 38 form a chamber 40 located therebetween in which the head pulley 33 and discharge end of the conveyor belt 31 are located.

The conveyor belt cleaner and tensioning arrangement 30 includes a conveyor belt cleaner 44 and one or more conveyor belt cleaner tensioners 46. As shown in FIG. 1, the conveyor belt cleaner and tensioning arrangement 30 includes a first conveyor belt cleaner tensioner 46 and a second conveyor belt cleaner tensioner 46' that are constructed substantially identical to one another.

As shown in FIG. 3, the conveyor belt cleaner 44 includes a cross-shaft 48 and one or more full-face contact scraper blades 50 that are removably connected to the cross-shaft 48. The cross-shaft 48 includes a first end 52, a second end 54, and a central longitudinal axis 56 which extends from the first end 52 to the second end 54. The cross-shaft 48 includes a central support member 58. The support member 58 may be formed from a wide-flange beam such as a W6×15 beam. The support member 58 includes a top wall or flange 60 that is connected to a generally parallel bottom wall or flange 61 by a generally vertical wall or web 62. The flange 60 includes a plurality of apertures 63. End plates 64A and B are respectively attached to each end of the support member 58. Each end plate 64A and B includes a plurality of apertures 66 and a handle 68 that extends upwardly above the top flange 60 of the support member 58. A deflector plate 70 extends generally from the intersection of the web 62 and the top flange 60 of the support member 58 to the edge of the bottom flange 61, and extends substantially the entire length of the support member 58.

A pair of mounting members 72A and B are respectively attached to the end plates 64A and B of the support member 58. Each mounting member 72A and B includes a generally circular shaft 74 attached at one end to a mounting plate 76. The mounting plate 76 includes a plurality of apertures 78. The apertures 78 in the mounting plate 76 are adapted to align with the apertures 66 in the end plates 64A and B such that the mounting plate 76 can be removably connected to the end plate 64A and B by fasteners such as bolts and nuts. The shaft 74 includes a mounting recess such as an elongate generally rectangular keyway 80 that extends the entire length of the shaft 74 from the mounting plate 76 to the free end of the shaft 74. The shaft 74 also includes a plurality of circular grooves 82 that are spaced apart from one another and that extend in a generally circular manner around the shaft 74, the purpose for which will be explained later herein. The shaft 74 of the mounting member 72A is adapted to extend through an aperture in the first chute wall 36 and the shaft 74 of the mounting member 72B is adapted to extend through an aperture formed in the second chute wall 38. As shown in FIGS. 18–21, the shaft 74 may include one or more mounting recesses such as bores 86 which extend diametrically through the shaft 74, rather than the keyway 80. The bores 86 are spaced apart equally along the shaft 74 at the same interval as the grooves 82 are spaced apart from one another. A pin 88 removably extends through a bore 86 to couple the tensioner 46, mounting brackets or other parts, to the shaft 74.

As shown in FIGS. 1, 10 and 11, the conveyor belt cleaner and tensioning arrangement 30 includes a mounting bracket 90A and a mounting bracket 90B that are substantially identical to one another. Each mounting bracket 90A and 90B includes a plate 92 having a plurality of apertures 78 and generally circular collar 94 attached to and extending outwardly from the plate 92. A generally circular bore 96 extends through the plate 92 and the collar 94. The mounting brackets 90A and 90B may include a bearing assembly. As shown in FIG. 1, the plate 92 of the mounting bracket 90A is adapted to be attached to the first chute wall 36 and the plate 92 of the mounting bracket 90B is adapted to be attached to the second chute wall 38 by fasteners or welding.

An alternate embodiment of the mounting brackets 90A and 90B is shown in FIGS. 8 and 9 as mounting bracket 100.

The mounting bracket 100 includes a base 102 and a generally circular collar 104 attached to the base 102 that extends generally parallel with the base 102. A bore 106 extends through the collar 104. The base 102 of the mounting bracket 100 is adapted to be attached to a stationary support member located outside of the conveyor chute 34, rather than directly to the conveyor chute 34 as are the mounting brackets 90A and 90B.

The conveyor belt cleaner and tensioning arrangement 30 also includes a pair of cross-shaft stop members 110A and B. The cross-shaft stop member 110A is shown in FIG. 13 and the cross-shaft stop member 110B is constructed substantially identical to the cross-shaft stop member 110A. The cross-shaft stop member 110A includes a generally planar plate member 112 having an aperture 114 and an aperture 116. The aperture 116 includes a generally circular portion 118 that is adapted to receive the shaft 74 of the mounting member 72A or B, and a keyway 120 having stop walls 121A and B. The keyway 120 is adapted to receive a generally rectangular key 122 that is inserted within the keyway 80 of the shaft 74. The keyway 120 has a width that is greater than the width of the key 122 so that the key 122 can rotate or pivot a predetermined angle, such as approximately 37.5°, between the stop walls 121 A and 121 B of the keyway 120.

A retainer ring 84, such as a snap ring, as best shown in FIG. 7, is adapted to be located in a groove 82 for attachment to the shaft 74 of each mounting member 72A and B. The retainer rings 84 prevent longitudinal movement of the mounting members 72A and B through the bores 96 or 106 of the mounting brackets 90A and B or 100 in a direction toward the center of the conveyor chute 34 as the retainer rings 84 are adapted to engage the mounting brackets 90A and B or 100.

Each scraper blade 50, as best shown in FIGS. 14 and 15, includes a mounting base 130 that is adapted to be removably attached to the cross-shaft 48 and a blade member 132 extending outwardly from the mounting base 130 to a scraping tip 133. The mounting base 130 and blade member 132 extend between a generally planar left sidewall surface 134 and a generally planar and parallel right sidewall surface 136. The mounting base 130 includes a generally planar basewall 138 having a front edge 139 and a rear edge 141 that is adapted to be placed in engagement with the top flange 60 of the support member 58. The mounting base 130 and the blade member 132 are primarily formed from an elastomeric material such as urethane or rubber. The mounting base 130 also includes a substantially rigid mounting member 140. Each mounting member 140 includes a base 142 including a plurality of threaded apertures 144. The base 142 is secured to the mounting base 130 of the scraper blade 50 by a connector member 146 which is attached to the base 142 and that is embedded within the mounting base 130. The mounting members 140 are preferably made from metal. The threaded apertures 144 of the mounting members 140 are adapted to align with the apertures 63 in the top flange 60 of the support member 58 such that the scraper blades 50 may be removably attached to the support member 58 by threaded fasteners 148. As best shown in FIG. 14, the mounting members 140 each have a width that is substantially shorter than the width of the scraper blade 50 between the sidewall surfaces 134 and 136. The mounting members 140 are spaced apart from one another across the width of the mounting base 130 of the scraper blade 50.

The scraping tip 133 of the blade member 130 includes a generally linear scraping edge 150. The scraper blade 50 includes a front surface 156 which extends from the front edge 139 of the basewall 138 to the scraping edge 150 which forms a distal edge of the front surface 156. The scraper blade 50 also includes a rear surface 158 that extends from the rear edge 141 of the basewall 138 to a distal edge 160. The blade face surface 162 is curved to conform to the curvature of the conveyor belt such that the entire blade face surface 162 will engage the belt in full-face contact. A blade face surface 162 extends between the distal scraping edge 150 and the distal edge 160. The blade face surface 162 is curved to conform to the curvature of the conveyor belt such that the entire blade face surface 162 will engage the belt in full-face contact.

As best shown in FIG. 15, the front surface 156 is configured such that it includes coordinate points 166A–K, with coordinate point 166A being located at the intersection of the basewall 138 and the front surface 156, and the coordinate point 166K being located at the distal scraping edge 150. The rear surface 158 is configured such that it includes coordinate points 168A–H, wherein the coordinate point 168A is located at the intersection of the basewall 138 and the rear surface 158, and the coordinate point 168H is located at the distal edge 160.

The portion of the front surface 156 that extends along the blade member 132 of the scraper blade 50, is preferably formed to have a configuration that provides a substantially constant cleaning angle between the front surface 156 at the scraping edge 150 with the outer surface of the conveyor belt as the blade member 132 wears down during use and the scraper blade 50 is radially adjusted about the longitudinal axis 56 to remain in full-face scraping engagement with the conveyor belt. A configuration for the front surface 156 that provides a substantially constant cleaning angle is disclosed in U.S. Pat. No. 4,917,231 of Martin Engineering Company which is hereby incorporated by reference. The portion of the front surface 156 that extends along the blade member 132 of the scraper blade 50 may have a configuration corresponding to the coordinate points determined from the following equation, as disclosed in U.S. Pat. No. 4,917,231, in an X-Y coordinate system:

$$X_T = r_T \cos(KE_T)$$

$$Y_T = r_T \sin(KE_T).$$

One preferred construction of the scraper blade 50 includes a front surface 156 having a configuration approximately including the following coordinate points 166A–K in an X-Y coordinate system:

| Front Surface 156 | | |
|---|---|---|
| Coordinate Point | X | Y |
| 166A | 0 | 0 |
| 166B | 0.44 | 2.70 |
| 166C | 2.02 | 4.67 |
| 166D | 3.54 | 6.64 |
| 166E | 3.99 | 7.27 |
| 166F | 4.93 | 8.61 |
| 166G | 6.54 | 10.58 |
| 166H | 9.36 | 12.54 |
| 166I | 11.76 | 13.53 |
| 166J | 12.89 | 13.85 |
| 166K | 16.48 | 14.46 |

For example, coordinate point 166B is located 0.44 units along the X axis and 2.70 units along the Y axis from the coordinate point 166A which is located at X=0 and Y=0. The units are preferably in inches. This embodiment of the scraper blade 50 also includes a rear surface 158 having a configuration approximately including the following coordinate points in an X-Y coordinate system:

| Rear Surface 158 | | |
|---|---|---|
| Coordinate Point | X | Y |
| 168A | 5.91 | 0 |
| 168B | 6.11 | 3.59 |
| 168C | 6.70 | 4.77 |
| 168D | 7.33 | 5.95 |
| 168E | 8.04 | 7.13 |
| 168F | 9.04 | 8.31 |
| 168G | 10.71 | 9.49 |
| 168H | 13.13 | 10.65 |

Figure 22:
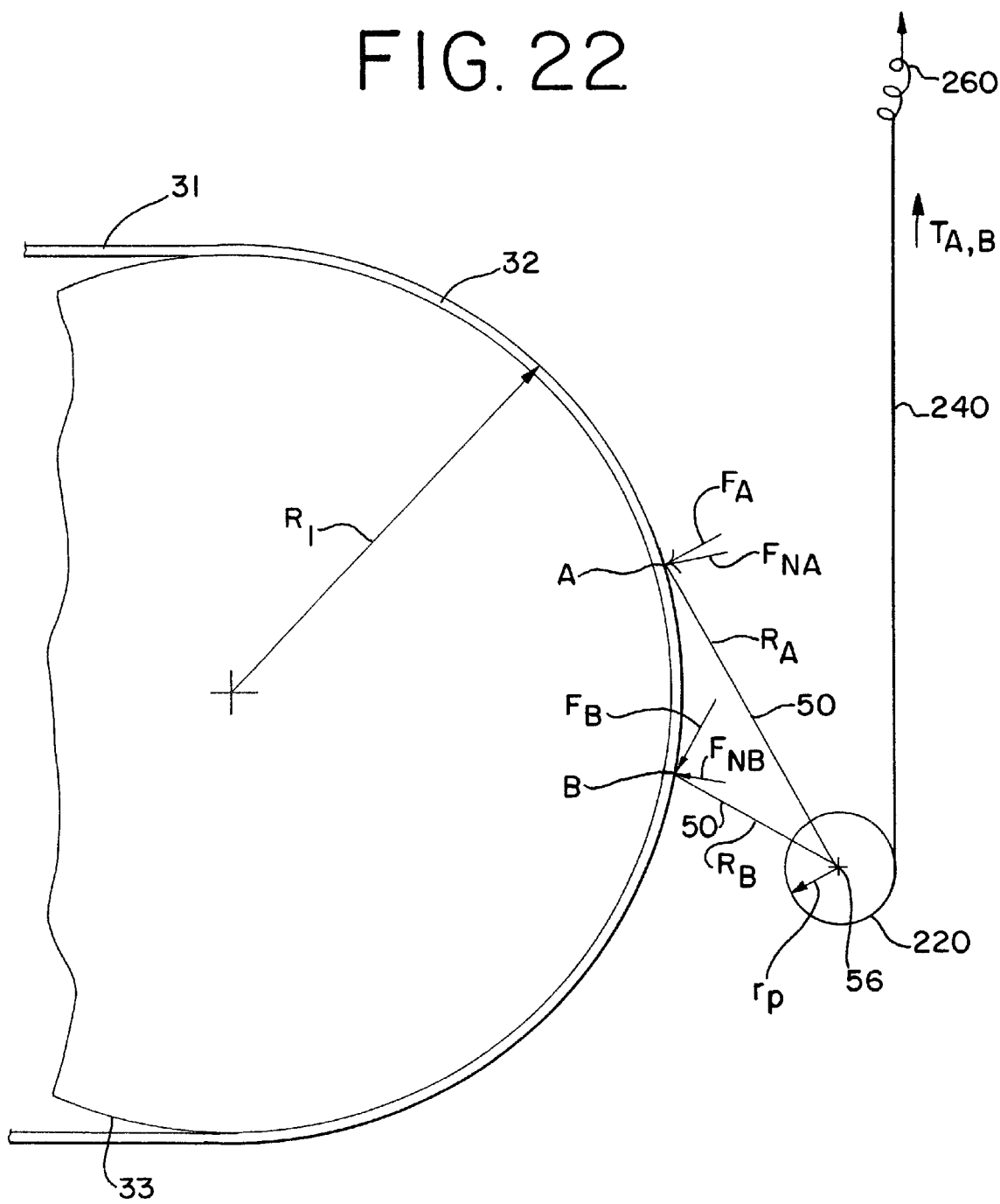
FIG. 22 is a diagram illustrating the operation of the present invention.

This embodiment of the scraper blade 50 is intended for use with a conveyor mechanism where the distance $R_1$ as shown in FIG. 22, which equals the radius of the head pulley 33 plus the thickness of the conveyor belt 31, is approximately equal to or larger than 23.5 inches.

Another embodiment of a scraper blade for use in connection with the present invention is shown in FIGS. 6, 16 and 17 and is designated with the reference number 176. The scraper blade 176 is preferably used in connection with conveyor mechanisms wherein the radius of the head pulley 33 plus the thickness of the conveyor belt 31 is from approximately eleven inches to approximately twenty-three and one-half inches. The scraper blade 176 includes a mounting base 178 and a blade member 180. The scraper blade 176 includes a left sidewall surface 182 and a right sidewall surface 184. The scraper blade 176 includes a basewall 186 having a generally linear front edge 188 and a generally linear and parallel rear edge 190. The mounting base 130 includes a mounting member 192 that is constructed substantially identical to the mounting member 140 and is preferably made from metal. The scraper blade 176, other than the mounting member 192, is preferably made from an elastomeric material such as urethane or rubber.

The scraper blade 176 includes a front surface 196 that extends from the front edge 188 of the basewall 186 to a distal scraping edge 198. The scraper blade 176 includes a rear surface 200 that extends from the rear edge 190 of the basewall 186 to a distal edge 202. A blade face surface 204 extends between the distal scraping edge 198 of the front surface 196 and the distal edge 202 of the rear surface 200. The blade face surface 204 is curved to conform to the curved surface of the conveyor belt to provide full-face contact with the conveyor belt.

The shape or configuration of the front surface 196 is preferably approximately formed to include the $X_T$ and $Y_T$ coordinate points determined from the trigonometric equations set forth above and as disclosed in U.S. Pat. No. 4,917,231, such that the front surface 196 maintains a substantially constant cleaning angle at the distal scraping edge 198 with the outer surface 32 of the conveyor belt 31 as the scraping edge 198 and blade member 180 wear and the scraper blade 176 is radially adjusted to maintain full-face scraping engagement with the conveyor belt.

One preferred embodiment of the scraper blade 176 includes a front surface 196 having a configuration including coordinate points 206A–K. The coordinate points 206A–K of the front surface 196 are approximately located at the following coordinates in an X-Y coordinate system:

| Front Surface 196 | | |
|---|---|---|
| Coordinate Point | X | Y |
| 206A | 0 | 0 |
| 206B | 0.74 | 2.75 |
| 206C | 2.08 | 3.85 |
| 206D | 3.34 | 4.95 |
| 206E | 4.45 | 6.05 |
| 206F | 5.30 | 7.16 |
| 206G | 6.28 | 8.26 |
| 206H | 7.86 | 9.36 |
| 206I | 10.09 | 10.19 |
| 206J | 12.68 | 10.49 |
| 206K | 15.99 | 10.25 |

The rear surface 200 of this embodiment of the scraper blade 176 is configured to correspond to the following coordinate points in an X-Y coordinate system:

| Rear Surface 200 | | |
|---|---|---|
| Coordinate Point | X | Y |
| 208A | 5.91 | 0 |
| 208B | 6.12 | 2.58 |
| 208C | 6.64 | 3.56 |
| 208D | 7.27 | 4.66 |
| 208E | 7.96 | 5.67 |
| 208F | 8.82 | 6.47 |
| 208G | 10.41 | 7.22 |
| 208H | 12.10 | 7.65 |

The configuration of the front surfaces 166 and 196 and of the rear surfaces 158 and 200 may be approximated by arcs of a circle between their respective coordinate points 166D–166K, 168B–168H, 206D–206K and 208B–208H.

The scraper blades 150 and 176 each include a plurality of elongate ridges 210A–D which extend across the front surfaces 156 and 196. The ridges 210A–D respectively indicate when the scraper blade 150 or 176 has been worn down such that 25%, 50%, 75% and 100% of the total wear volume of the blade member 132 or 180 of the scraper blades 150 and 176 has been worn away. The scraper blades 150 and 176 should be replaced between 75% and 100% of wear, and before the 100% wear ridge 210D is reached. The ridges 210A–D may also be formed as grooves.

The conveyor belt cleaner tensioner 46, as best shown in FIGS. 1, 2 and 7, includes a mounting member such as a pulley 220. The pulley 220 includes a sheave 222 having a generally circular peripheral edge including a circular groove 224. The sheave 222 includes a cut-out portion that forms a socket 226. A cylindrical hub 228 is attached to and extends through the center of the sheave 222. The hub 228 includes a generally cylindrical bore 230 and a keyway 232. A plurality of cable keepers 234 are attached to the sheave 222 adjacent the groove 224. The bore 230 is sized such that the shaft 74 of the mounting member 72A or B will fit closely within the bore 230. A key 236 is adapted to be inserted in the keyway 232 of the pulley 220 and the keyway 80 of the shaft 74 of the conveyor belt cleaner cross-shaft 48, such that the pulley 220 is coupled for conjoint rotation with the shaft 74.

The tensioner 46 includes an elongate and flexible cable 240. The cable 240 may be made from wire rope, nylon rope and other types of materials that provide sufficient tensile strength. The cable 240 includes a first end 242 and a second end 244. The first end 242 of the cable 240 includes an enlarged stop member 246. The second end 244 of the cable 240 is folded over upon itself and around a thimble 248 to form an eye 250. The second end 244 of the cable 240 is secured to itself by a plurality of cable clamps 252.

The tensioner 46 also includes a biasing member 260 such as a drawbar spring. The biasing member 260 includes a generally helical coil compression spring 262 having a first end 264 and a second end 266. The biasing member 260 also includes a first generally U-shaped drawbar 268 having a first end 270 and a second end 272, and a second generally U-shaped drawbar 274 having a first end 276 and a second end 278. The first drawbar 268 extends through the center of the spring 262 such that the second end 272 of the first drawbar 268 is adapted to engage the second end 266 of the spring 262 and such that the first end 270 of the first drawbar 268 extends outwardly beyond the first end 264 of the spring 262. The second drawbar 274 extends through the center of the spring 262 such that the second end 278 of the second drawbar 274 is adapted to engage the first end 264 of the spring 262 and such that the first end 276 of the second drawbar 274 extends outwardly beyond the second end 266 of the spring 262. The first drawbar 268 is disposed at a generally ninety degree angle to the second drawbar 274. The second end 244 of the cable 240 is attached to the first end 270 of the first drawbar 268. The first end of the spring 262 is movable with respect to the second end 266 along a generally linear central axis of the spring 262.

The tensioner 46 includes an actuator member 284 such as a turnbuckle. The actuator member 284 includes an elongate body 286, a first threaded rod 288 threadably attached to a first end of the body 286 and a second threaded rod 290 threadably attached to a second end of the body 286. The first threaded rod 288 includes a clevis 292 and a clevis pin 294 at its outer end. The second threaded rod 290 includes a clevis 296 and a clevis pin 298 at its outer end. The clevis 292 of the actuator member 284 is adapted to be connected to the first end 276 of the second drawbar 274 of the biasing member 260. The clevis 296 of the actuator member 284 is adapted to be connected to a mounting bracket 310. The mounting bracket 310 is adapted to be attached to the conveyor chute 34 or another stationary structure. The clevis 292 and the clevis 296 are selectively movable with respect to one another along a generally linear axis. The actuator member 284 may alternately comprise a pneumatic or hydraulic cylinder or spring, a winch or the like.

Alternatively, the tensioner may comprise an air tensioner (not shown) including an expandable air bag including a chamber that contains air under pressure. A lever (not shown) is attached to the shaft 74 of the mounting member 72A for conjoint rotation. One end of the air tensioner is attached to the lever and the opposite end of the air tensioner is attached to a stationary bracket (not shown). As the scraper blades 50 wear down, the air pressure within the bag will expand the bag and rotate or pivot the lever and the shaft 74 to maintain the scraper blades 50 in scraping engagement with the conveyor belt. The air pressure within the bag is controlled and regulated to reduce the air pressure as the bag expands in order to maintain a substantially constant scraping pressure.

In another embodiment the biasing member 260 and actuator member 284 may be replaced by a second pulley (not shown) rotatably attached to the bracket 310. The cable 240 may be looped over the second pulley and a counterweight (not shown) may be attached to and suspended by the second end 244 of the cable 240. The weight of the counterweight provides a rotational biasing force to the shaft 74.

Another embodiment of the tensioner is shown in FIGS. 18 and 19 and is identified with the reference number 320. The tensioner 320 includes a biasing member 322 having a first end 324 and a second end 326. The biasing member 322 is constructed substantially identical to the biasing member 260. The tensioner 320 also includes an actuator member 328 which is constructed substantially identical to the actuator member 284. The actuator member 328 is attached at one end to the second end 326 of the biasing member 322 and is attached at a second opposite end to the mounting bracket 310.

The tensioner 320 also includes a mounting member 330 which is adapted to be connected to the first end 52 of the cross shaft 48 for conjoint rotation with the cross shaft 48 about the axis 56. The mounting member 330 includes a hub having diametrically opposing apertures. A pin 88 extends through the hub apertures and through a bore 86 on the shaft 74 to removably connect the mounting member 33 to the shaft 74. The mounting member 330 may alternatively be removably connected to the cross shaft 48 in the same manner as the pulley 220. The mounting member 330 includes a plate 332 which is located generally perpendicular to the axis 56 and which includes a plurality of apertures 334 located outwardly at a radius from the axis 56. The apertures 334 are generally equally spaced from one another in a generally circular manner about the axis 56. The tensioner 320 also includes a link 336 having a first end 338 and a second end 340. The link 336 includes a first bar 342 and a spaced apart and generally parallel second bar 344. Each bar 342 and 344 includes an aperture at each end. A fastener 346, such as a pin or bolt and nut, extends through the apertures in the upper end of the bars 342 and 344. The fastener 346 connects the second end 340 of the link 336 to the first end 324 of the biasing member 322. A fastener 348, such as a pin or a bolt and nut, extends through the apertures in the lower ends of the bars 342 and 344 and through a selected aperture 334 in the mounting member 330. The bars 342 and 344 are located on opposite sides of the plate 332. The first end 338 of the link 336 is thereby pivotally attached to the mounting member 330. The tensioner 320 operates in the same manner as the tensioner 46 in providing a rotational biasing force to the cross shaft 48.

An additional embodiment of the tensioner is shown in FIGS. 20 and 21 and is designated with the reference number 360. The tensioner 360 includes an actuator member 362 having a first end 364 and a second end 366. The actuator member 362 is constructed substantially identical to the actuator members 284 and 228. The tensioner 360 also includes a mounting member 368 connected to the first end 52 of the cross shaft 48 for conjoint rotation therewith about the axis 56. The mounting member 368 is constructed substantially identically to the mounting member 330 and includes a plate 370 having a plurality of apertures 372 substantially equally spaced apart from one another in a generally circular manner. The tensioner 360 also includes a first link 374 having a first end 376 and a second end 378. The link 374 is constructed substantially identical to the link 336. The first end 376 of the link 374 is pivotally attached to the plate 370 by a fastener 380. The tensioner 360 also includes a second link 382 comprising a single bar. Each end of the second link 382 includes an aperture. A fastener 384 pivotally attaches the bottom end of the second link 382 to the second end 378 of the first link 374. The top end of the second link 382 is pivotally connected to the first end 364 of the actuator member 362 by a fastener 386 such as a clevis pin or a bolt and nut. The tensioner 360 operates in a similar manner to the tensioner 46 in that the actuator member 362 will provide selective rotation of the cross shaft 48 about the axis 56. However, the tensioner 360 does not include a biasing member, such as the biasing member 260, and therefore does not impart a rotational biasing force to the cross shaft 48 other than through activation of the actuator member 362.

In operation, the mounting bracket 90A is attached to the first chute wall 36 and the mounting bracket 90B is attached to the second chute wall 38. The respective bores 96 of the brackets 90A and B are coaxially aligned with one another. The cross-shaft stop 110A is longitudinally slid over the shaft 74 of the mounting member 72A and the shaft 74 is then inserted through the aperture in the first chute wall 36 and through the bore 96 of the mounting bracket 90A. The cross-shaft stop 110B is similarly slid over the shaft 74 of the mounting member 72A and the shaft 74 is slid through the aperture in the second chute wall 38 and the bore 96 of the mounting bracket 90B. End plate 64A of the support member 58 is connected to the mounting plate 76 of the mounting member 72A and the end plate 64B is attached to the mounting plate 76 of the mounting member 72B to thereby assemble the cross-shaft 48. A retainer ring 84 is positioned within a groove 82 of the shaft 74 of the mounting member 72A that is located most closely adjacent to the outer end of the collar 94 of the mounting bracket 90A. A retainer ring 84 is also located in a groove 82 of the shaft 74 of the mounting member 72I that is located most closely adjacent to the outer end of the collar 94 of the mounting bracket 90B. The retainer rings 84 are adapted to engage the mounting brackets 90A and B to limit longitudinal movement of the conveyor belt cleaner 44 along the longitudinal axis 56.

One or more scraper blades 50 are attached to the support member 58 of the cross-shaft 48 by fasteners 148 which extend through the apertures 63 in the top flange 60 of the support member 58 and that threadably engage the mounting member 192 of the scraper blades 50. The scraper blades 50 are thereby selectively removable and replaceable on the cross-shaft 48. The cross-shaft stop members 110A and B are respectively connected to the chute walls 36 and 38 by fasteners which extend through the aperture 114. A key 122 is inserted into the keyway 80 of the shaft 74 of the mounting member 72A and into the keyway 120 of the cross-shaft stop member 110A. A key 122 is also inserted into the keyway 80 of the shaft 74 of the mounting member 72B and into the keyway 120 of the cross-shaft stop member 110B. The cross-shaft 48 and scraper blades 50 are rotatable or pivotal about the longitudinal axis 56. The keys 122 conjointly pivot with the cross-shaft 48 within the keyways 120 of the cross-shaft stop members 110A and B between the walls 121A and 121B. The walls 121A and B of the cross-shaft stop members 110A and B are preferably disposed relative to one another such that the cross-shaft stop members 110A and B will allow the cross-shaft 48 and scraper blades 50 to rotate or pivot about the longitudinal axis 56 through a selected angle such as approximately 37.5 degrees.

A conveyor belt cleaner tensioner 46 is attached to the shaft 74 of the mounting member 72A of the conveyor belt cleaner 44. The pulley 220 is slid over the end of the shaft 74 of the mounting member 72A such that the shaft 74 extends through the bore 230 of the pulley 220. A key 236 is inserted within the keyway 232 of the pulley 220 and the keyway 80 of the shaft 74 such that the pulley 220 is coupled for conjoint rotation with the shaft 74. The mounting bracket 310 is attached to the first chute wall 36 or to another stationary structure. The clevis 296 of the actuator member 284 is attached to the mounting bracket 310 by the clevis pin 298. The first end 276 of the second drawbar 274 of the biasing member 260 is attached to the clevis 292 of the actuator member 284 by the clevis pin 294.

The stop member 246 of the cable 240 is positioned within the socket 226 of the pulley 220 and the cable 240 is inserted into the groove 224 of the pulley 220. The cable keepers 234 assist in maintaining the cable 240 within the groove 224 when the cable 240 is slack. The second end 244 of the cable 240 is threaded through the eye at the first end 270 of the first drawbar 268 of the biasing member 260 and is folded over and connected to itself by one or more cable clamps 252. The second end 244 of the cable 240 is thereby connected to the first drawbar 268 of the biasing member 260. When the biasing member 260 and/or actuator member 284 apply tension to the cable 240, the stop member 246 couples the first end 242 of the cable 240 to the pulley 220. If desired, a second conveyor belt cleaner tensioner 46' can be attached to the shaft 74 of the mounting member 72B of the cross-shaft 48 and to the second chute wall 38 or any other stationary structure. One or two tensioners 46 and 46' may be used depending upon the width of the conveyor belt 31, the length of the conveyor belt cleaner 44, and the magnitude of the biasing force that is to be applied to the conveyor belt cleaner 44.

As shown in FIGS. 1 and 2, the biasing member 260 and actuator member 284 extend generally coaxial with one another and are disposed in a generally vertical orientation. If desired, the biasing member 260 and actuator member 284 may be positioned in a generally horizontal orientation or at any other angle. If desired, a second pulley (not shown) may be rotatably attached to a stationary structure and the cable 240 can be wrapped partially around the second pulley to maintain the lower portion of the cable 240 between the second pulley and the pulley 220 generally vertical while allowing the biasing member 260 and the actuator member 284 to be disposed at any desired angle. In addition, if desired, the actuator member 284 can be attached to the second drawbar 274 of the biasing member 260 by a second cable (not shown). The second cable may similarly be wrapped partially around a second pulley (not shorn) such that the actuator member 284 can be disposed at an angle relative to the biasing member 260.

Initially the cross-shaft 48 and scraper blades 50 of the conveyor belt cleaner 44 are located such that the blade face surface 162 of the scraper blades 50 is in full-face contact or engagement with the outer surface 32 of the conveyor belt 31. The length of the cables 240 of the tensioners 46 and 46' is then adjusted after loosening the cable clamps 252 to remove all of the slack from the cables 240. The cable clamps 252 are then tightened to securely fasten the second end 244 of the cable 240 to the biasing member 260. The body 286 of the actuator member 284 may then be selectively rotated with respect to the first and second threaded rods 288 and 290 such that the threaded rods 288 and 290 are drawn closer to one another and thereby shortening the overall length of the actuator member 284. As the length of the actuator member 284 is shortened, the spring 262 of the biasing member 260 will become compressed between the first drawbar 268 and the second drawbar 274 thereby creating a stored biasing force within the compressed spring 262.

The spring 262 of the biasing member 260 applies a tensile biasing force to the cable 240 which in turn applies a rotational biasing force to the pulley 220 and to the cross-shaft 48. As the distal scraping edge 150 of the front surface 156, the distal edge 160 of the rear surface 158, and the tip surface 162 that extends between the edges 150 and 160, wear down through scraping engagement with the rotating conveyor belt, the compressed spring 262 of the biasing member 260 will expand or elongate. The biasing member 260 will thereby rotate the pulley 220 and the cross-shaft 48 about the longitudinal axis 56 to maintain the newly formed distal edges 150 and 160, and the newly formed blade face surface 162, of the worn scraper blade 50 in biased full-face scraping engagement with the conveyor belt. The biasing member 260 is adapted to rotate the cross-shaft 48 and the scraper blades 50 through a selected angle about the longitudinal axis 56 over the wear life of the scraper blade 50, which is the maximum amount of rotation permitted by the cross-shaft stop members 110A and B.

As the blade member 132 of the scraper blade 50 wears down through scraping engagement with the rotating conveyor belt, the distal edge 150 of the front surface 156 becomes relocated along the front surface 156. The scraping angle defined between a first line passing through the distal edge 150 of the front surface 156 that is tangential to the conveyor belt and a second line extending through the distal edge 150 that is generally tangential to the front surface 156 will remain substantially constant as the blade member 132 of the scraper blade 50 wears down and is rotated about the axis 56 into continuing full-face contact with the conveyor belt due to the configuration of the front surface 156.

The tip surface 162 of the blade member 132 of the scraper blade 50 has a width that extends between the left sidewall surface 134 and the right side wall surface 136. The blade face surface 162 also has a height that extends between the distal edge 160 of the rear surface 158 and the distal edge 150 of the front surface 156. The blade face surface 162 therefore has a surface area defined by the width and the height of the blade face surface 162. The biasing member 260 applies a rotational biasing force to the pulley 220 and to the cross-shaft 48 which rotates the blade face surface 162 into full-face engagement with the conveyor belt with a scraping force that is generally normal to the surface 32 of the conveyor belt 31. The blade face surface 162 is thereby pressed against the surface 32 of the conveyor belt with a scraping pressure that is equal to the scraping force divided by the area of the blade face surface 162 that is engaging the surface 32 of the conveyor belt.

To maintain efficient cleaning of the conveyor belt 31, the scraping pressure with which the blade face surface 162 engages the conveyor belt should remain generally constant through the wear life of the scraper blades 50. The portion of the rear surface 158 that extends along the blade member 132 of the scraper blade 50 is configured and located with respect to the portion of the front surface 156 that extends along the blade member 132 such that the scraping pressure between the blade face surface 162 and the conveyor belt 31 remains substantially constant over the wear life of the scraper blade 50 as the scraping tip 133 of the blade member 132 wears down toward the mounting base 130.

As illustrated in FIG. 22, when the center of the blade face surface 162 of the scraper blade 50 engages the outer surface 32 of the conveyor belt 31 at position "A", the tensile biasing force ($T_A$) applied by the biasing member 260 to the cable 240 and to pulley 220 is equal to the spring constant of the spring 262 (which may be in pounds per inch) multiplied by the distance the spring 262 is compressed by the actuator member 284. This tensile biasing force $T_A$ creates a moment ($M_{56}$) about the longitudinal axis 56 that is equal to the tensile biasing force $T_A$ multiplied by the radius ($r_p$) from the longitudinal axis 56 to the center line of the cable 240 located within the groove 82 of the pulley 220. The moment $M_{56}$ created about the longitudinal axis 56 by the biasing member 260 is resisted by an equal and opposite moment equal to the length of a radius ($R_A$) extending from the longitudinal axis 56 to the center of the blade face surface 162 multiplied by a force ($F_A$) that is generally perpendicular to the radius $R_A$. Force $F_{NA}$ is the component of the force $F_A$ that is normal to the surface 32 of the conveyor belt 31. Force ($F_{NA}$) is divided by the area of the blade face surface 162 to obtain the scraping pressure with which the tip surface 162 engages the conveyor belt 31.

As the blade member 132 of the scraper blade 50 wears down toward the mounting base 130, the spring 262 will elongate to rotate the scraper blade 50 into continuing engagement with the conveyor belt 31 and the blade face surface 162 will move from position A as shown in FIG. 22 to position B. As the spring 262 elongates, it will provide a tensile force $T_B$ to the cable 240 and the pulley 220 that is smaller than the tensile force $T_A$. The tensile force $T_B$ will create a smaller moment about the longitudinal axis 56 than the tensile force $T_A$ as the radius $r_p$ of the pulley 220 remains constant. In addition, as the blade member 132 of the scraper blade 50 wears down, the length of the radius RB from the longitudinal axis 56 to the center of the blade face surface 162 at position B will be shorter than the radius $R_A$. The angle at which each radius $R_A$ and $R_B$ is located with respect to the curved surface 32 of the conveyor belt 31 also changes as the scraper blade 50 moves from position A to B. This results in a change in the force $F_{NB}$ that is normal to the surface of the conveyor belt that resists the biasing force created by the spring 262 of the biasing member 260 at position B from the force $F_{NA}$ at position A. As the scraping force $F_{NB}$ has changed from the scraping force $F_{NA}$, the area of the blade face surface 162 must accordingly change to maintain a constant scraping pressure. As the width of the blade face surface 162 remains substantially constant as the blade member 132 wears down, the height of the blade face surface 162 between the distal edge 150 of the front surface 156 and the distal edge 160 of the rear surface 158 (which generally corresponds to the thickness of the blade member 132) must change as the blade member 132 wears down to maintain a substantially constant full-face scraping pressure between the blade face surface 162 and the conveyor belt 31.

The shape of the front surface 156 and of the rear surface 158 of the blade member 132 of the scraper blade 50 are respectively configured and located with respect to one another such that a substantially constant scraping pressure will be maintained between the blade face surface 162 and the surface 32 of the conveyor belt 31 as the blade member 132 wears down and is rotated into continuing full face engagement with the conveyor belt 31 by the biasing member 260. The scraper blade 50 provides a substantially constant cleaning angle between the front surface 156 and the conveyor belt 31, and provides a substantially constant scraping pressure between the blade face surface 162 and the conveyor belt 31, as the blade member 132 of the scraper blade 50 wears down during use with conveyor belts 31 having a radius $R_1$ of approximately 23.5 inches or greater.

The scraper blade 176 includes a front surface 196 and a rear surface 200 that are configured and located with respect to one another such that the front surface 196 provides a substantially constant cleaning angle with the surface 32 of the conveyor belt 31 and such that the blade face surface 204 provides a substantially constant scraping pressure against the conveyor belt 31 as the blade member 180 wears down toward the mounting base 178 when used in connection with conveyor belts 31 having a radius RI of from approximately eleven inches to approximately 23.5 inches.

A preferred scraping pressure is approximately 2.75 pounds per square inch. As used herein, a substantially constant scraping pressure may deviate up to plus or minus fifteen percent from the average scraping pressure over the wear life of the scraper blades 50 and 176, and a substantially constant scraping angle may deviate up to plus or minus fifteen percent from the initial scraping angle. The initial scraping angle is preferably within the range of approximately 25° to 45°. The configuration of the front surfaces 166 and 196 and the rear surfaces 158 and 200 of the scraper blades 150 and 176 along the blade members 132 and 180 may deviate from the above X-Y coordinates for the coordinate points 166D–166K, 168B–168H, 206D–206K and 208B–208K plus or minus one-quarter (0.25) inch, and preferably plus or minus one tenth (0.1) inch, while still enabling a substantially constant cleaning angle and a substantially constant full-face scraping pressure to be maintained.

Various features of the invention have been particularly shown and described in connection with the illustrated embodiments of the invention, however, it must be understood that these particular arrangements merely illustrate, and that the invention must be given its fullest interpretation within the terms of the appended claims.

What is claimed is:

1. A conveyor belt cleaner scraper blade adapted, when appropriately tensioned against a conveyor belt, to maintain both a substantially constant cleaning angle and a substantially constant cleaning pressure without readjustment of the tensioning system, said scraper blade including:
    a front surface having a first distal edge;
    a rear surface having a second distal edge; and
    a blade face surface extending between said first and second distal edges of said front and rear surfaces defining a full-face contact surface adapted to engage said conveyor belt across substantially the full surface of said full-face contact surface;
    whereby said front surface has a specially curved configuration so as to insure, when said scraper blade is properly tensioned against the conveyor belt, maintenance of both a substantially constant cleaning angle and a substantially constant cleaning pressure without further tensioner adjustment as said scraper blade wears.

2. The conveyor belt cleaner scraper blade of claim 1 wherein said front surface has a configuration corresponding approximately to the following coordinate points in an X-Y coordinate system:
    a first coordinate point having an X coordinate of from approximately 3.9 units to approximately 4.1 units and a Y coordinate of from approximately 7.2 units to approximately 7.4 units;
    a second coordinate point having an X coordinate of from approximately 4.8 units to approximately 5.0 units and a Y coordinate of from approximately 8.5 units to approximately 8.7 units;
    a third coordinate point having an X coordinate of from approximately 6.4 units to approximately 6.6 units and a Y coordinate of from approximately 10.5 units to approximately 10.7 units;
    a fourth coordinate point having an X coordinate of from approximately 9.3 units to approximately 9.5 units and a Y coordinate of from approximately 12.4 units to approximately 12.6 units;
    a fifth coordinate point having an X coordinate of from approximately 11.7 units to approximately 11.9 units and a Y coordinate of from approximately 13.4 units to approximately 13.6 units; and
    a sixth coordinate point having an X coordinate of from approximately 12.8 units to approximately 13.0 units and a Y coordinate of from approximately 13.8 units to approximately 14.0 units.

3. The conveyor belt cleaner scraper blade of claim 2 wherein said rear surface has a configuration corresponding approximately to the following coordinate points in said X-Y coordinate system:
    a seventh coordinate point having an X coordinate of from approximately 7.2 units to approximately 7.4 units and a Y coordinate of from approximately 5.9 units to approximately 6.1 units;
    an eighth coordinate point having an X coordinate of from approximately 7.9 units to approximately 8.1 units and a Y coordinate of from approximately 7.0 units to approximately 7.2 units;
    a ninth coordinate point having an X coordinate of from approximately 8.9 units to approximately 9.1 units and a Y coordinate of from approximately 8.2 units to approximately 8.4 units; and
    a tenth coordinate point having an X coordinate of from approximately 10.6 units to approximately 1.08 units and a Y coordinate of from approximately 9.4 units to approximately 9.6 units;
    said front surface being disposed with respect to said rear surface according to said X-Y coordinates of said coordinate points.

4. The conveyor belt cleaner scraper blade of claim 1 wherein said front surface has a configuration corresponding approximately to the following coordinate points in an X-Y coordinate system:
    a first coordinate point having an X coordinate of from approximately 5.2 units to approximately 5.4 units and a Y coordinate of from approximately 7.1 units to approximately 7.3 units;
    a second coordinate point having an X coordinate of from approximately 6.2 units to approximately 6.4 units and a Y coordinate of from approximately 8.2 units to approximately 8.4 units;
    a third coordinate point having an X coordinate of from approximately 7.8 units to approximately 8.0 units and a Y coordinate of from approximately 9.3 units to approximately 9.5 units;
    a fourth coordinate point having an X coordinate of from approximately 10.0 units to approximately 10.2 units and a Y coordinate of from approximately 10.1 units to approximately 10.3 units; and
    a fifth coordinate point having an X coordinate of from approximately 12.6 units to approximately 12.8 units and a Y coordinate of from approximately 10.4 units to approximately 10.6 units.

5. The conveyor belt cleaner scraper blade of claim 4 wherein said rear surface has a configuration corresponding approximately to the following coordinate points in said X-Y coordinate system:
    a sixth coordinate point having an X coordinate of from approximately 7.2 units to approximately 7.4 units and a Y coordinate of from approximately 4.6 units to approximately 4.8 units;
    a seventh coordinate point having an X coordinate of from approximately 7.9 units to approximately 8.1 units and a Y coordinate of from approximately 5.6 units to approximately 5.8 units;
    an eighth coordinate point having an X coordinate of from approximately 8.7 units to approximately 8.9 units and a Y coordinate of from approximately 6.4 units to approximately 6.6 units; and a ninth coordinate point having an X coordinate of from approximately 10.3 units to approximately 10.5 units and a Y coordinate of from approximately 7.1 units to approximately 7.3 units;

said front surface being disposed with respect to said rear surface according to said X-Y coordinates of said coordinate points.

6. A scraper blade for a conveyor belt cleaner having a cross shaft, said scraper blade including:

a blade member including a front surface having a first distal edge, and a rear surface having a second distal edge, said front surface having a configuration corresponding approximately to the following coordinate points in an X-Y coordinate system:

a first coordinate point having an X coordinate of from approximately 3.9 units to approximately 4.1 units and a Y coordinate of from approximately 7.2 units to approximately 7.4 units;

a second coordinate point having an X coordinate of from approximately 4.8 units to approximately 5.0 units and a Y coordinate of from approximately 8.5 units to approximately 8.7 units;

a third coordinate point having an X coordinate of from approximately 6.4 units to approximately 6.6 units and a Y coordinate of from approximately 10.5 units to approximately 10.7 units;

a fourth coordinate point having an X coordinate of from approximately 9.3 units to approximately 9.5 units and a Y coordinate of from approximately 12.4 units to approximately 12.6 units;

a fifth coordinate point having an X coordinate of from approximately 11.7 units to approximately 11.9 units and a Y coordinate of from approximately 13.4 units to approximately 13.6 units; and a sixth coordinate point having an X coordinate of from approximately 12.8 units to approximately 13.0 units and a Y coordinate of from approximately 13.8 units to approximately 14.0 units, and said rear surface having a configuration corresponding approximately to the following coordinate points in said X-Y coordinate system:

a seventh coordinate point having an X coordinate of from approximately 7.2 units to approximately 7.4 units and a Y coordinate of from approximately 5.9 units to approximately 6.1 units;

an eighth coordinate point having an X coordinate of from approximately 7.9 units to approximately 8.1 units and a Y coordinate of from approximately 7.0 units to approximately 7.2 units;

a ninth coordinate point having an X coordinate of from approximately 8.9 units to approximately 9.1 units and a Y coordinate of from approximately 8.2 units to approximately 8.4 units; and a tenth coordinate point having an X coordinate of from approximately 10.6 units to approximately 10.8 units and a Y coordinate of from approximately 9.4 units to approximately 9.6 units, whereby said scraper blade is adapted to maintain a substantially constant cleaning angle and a substantially constant cleaning pressure with a conveyor belt as the scraper blade wears.

7. The scraper blade of claim 6 wherein said front surface of said blade member includes a plurality of wear indicia, each said wear indicia indicating a respective volume of said scraper blade that remains to be worn away.

8. The scraper blade of claim 6 wherein said front surface includes an eleventh coordinate point having an X coordinate of from approximately 16.4 units to approximately 16.6 units and a Y coordinate of from approximately 14.4 units to approximately 14.6 units.

9. The scraper blade of claim 8 wherein said rear surface includes a twelfth coordinate point having an X coordinate of from approximately 13.0 units to approximately 13.2 units and a Y coordinate of from approximately 10.6 units to approximately 10.8 units.

10. The scraper blade of claim 6 including a blade face surface extending between said first distal edge and said second distal edge.

11. The scraper blade of claim 6 including a mounting base adapted to be attached to the cross shaft, said blade member extending outwardly from said mounting base.

12. A scraper blade for a conveyor belt cleaner having a cross shaft, said scraper blade including:

a blade member including a front surface having a first distal edge, and a rear surface having a second distal edge, said front surface having a configuration corresponding approximately to the following coordinate points in an X-Y coordinate system:

a first coordinate point having an X coordinate of from approximately 5.2 units to approximately 5.4 units and a Y coordinate of from approximately 7.1 units to approximately 7.3 units;

a second coordinate point having an X coordinate of from approximately 6.2 units to approximately 6.4 units and a Y coordinate of from approximately 8.2 units to approximately 8.4 units;

a third coordinate point having an X coordinate of from approximately 7.8 units to approximately 8.0 units and a Y coordinate of from approximately 9.3 units to approximately 9.5 units;

a fourth coordinate point having an X coordinate of from approximately 10.0 units to approximately 10.2 units and a Y coordinate of from approximately 10.1 units to approximately 10.3 units; and a fifth coordinate point having an X coordinate of from approximately 12.6 units to approximately 12.8 units and a Y coordinate of from approximately 10.4 units to approximately 10.6 units, and said rear surface having a configuration corresponding approximately to the following coordinate points in said X-Y coordinate system:

a sixth coordinate point having an X coordinate of from approximately 7.2 units to approximately 7.4 units and a Y coordinate of from approximately 4.6 units to approximately 4.8 units;

a seventh coordinate point having an X coordinate of from approximately 7.9 units to approximately 8.1 units and a Y coordinate of from approximately 5.6 units to approximately 5.8 units;

an eighth coordinate point having an X coordinate of from approximately 8.7 units to approximately 8.9 units and a Y coordinate of from approximately 6.4 units to approximately 6.6 units; and a ninth coordinate point having an X coordinate of from approximately 10.3 units to approximately 10.5 units and a Y coordinate of from approximately 7.1 units to approximately 7.3 units, whereby said scraper blade is adapted to maintain a substantially constant cleaning angle and a substantially constant cleaning pressure with a conveyor belt as the scraper blade wears.

13. The scraper blade of claim 12 wherein said front surface includes a tenth coordinate point having an X coordinate of from approximately 15.9 units to approximately 16.1 units and a Y coordinate of from approximately 10.2 units to approximately 10.4 units.

14. The scraper blade of claim 13 wherein said rear surface includes an eleventh coordinate point having an X coordinate of from approximately 12.0 units to approximately 12.2 units and a Y coordinate of from approximately 7.6 units to approximately 7.8 units.

15. The scraper blade of claim 12 including a blade face surface extending between said first distal edge and said second distal edge.

16. The scraper blade of claim 12 including a mounting base adapted to be attached to the cross shaft, said blade member extending outwardly from said mounting base.

17. The scraper blade of claim 12 wherein said front surface of said blade member includes a plurality of wear indicia, each said indicia indicating a respective volume of said scraper blade that remains to be worn away.

18. A tensioner arrangement for a conveyor belt cleaner including a rotatable cross shaft having a central axis and a scraper blade attached to the cross shaft for cleaning a conveyor belt, said tensioner arrangement including:
   a mounting member adapted to be attached to the cross shaft for conjoint rotation with the cross shaft about the central axis, said mounting member including a plate having a plurality of apertures, said plate being disposed generally transversely to the central axis; and
   an actuator member having a first end and a second end, said first end of said actuator member being operatively attached to said mounting member at a selected one of said plurality of apertures, said second end of said actuator member adapted to be attached to a stationary member;
   whereby said actuator member is adapted to selectively apply a rotational biasing force to said mounting member and thereby rotate the cross shaft and the scraper blade about the central axis.

19. The tensioner arrangement of claim 18 wherein said actuator member comprises a turnbuckle.

20. A scraper blade for a conveyor belt cleaner having a cross shaft adapted to clean a conveyor belt, said scraper blade including:
   a mounting base adapted to be attached to the cross shaft, said mounting base including a mounting member having a base member and a connector member attached to and extending outwardly from said base member, said base member including one or more apertures, each said aperture adapted to receive a fastener for removably attaching said mounting base to the cross shaft, said connector member being embedded within said mounting base and thereby securing said base member to said mounting base to prevent relative movement between said base member and said mounting base; and
   a blade member extending outwardly from said mounting base, said blade member including a scraping tip adapted to engage the conveyor belt.

21. The scraper blade of claim 20 wherein said mounting member is formed from a rigid material and is at least partially embedded within an elastomeric material which substantially forms the remainder of said mounting base.

22. A tensioner arrangement for a conveyor belt cleaner including a rotatable cross shaft having a central axis and a scraper blade attached to the cross shaft for cleaning a conveyor belt, said tensioner arrangement including:
   a mounting member adapted to be attached to the cross shaft for conjoint rotation with the cross shaft about the central axis;
   a resilient biasing member having a first end and a second end, said first end of said biasing member being movable with respect to said second end of said biasing member, said first end of said biasing member being operatively attached to said mounting member; and
   an actuator member having a first end and a second end, said first end of said actuator member being operatively attached to said second end of said biasing member, said second end of said actuator member adapted to be attached to a stationary member;
   whereby said actuator member is adapted to selectively apply a force to said biasing member and to said mounting member and thereby rotate the cross shaft and the scraper blade about the central axis until the scraper blade engages the conveyor belt, whereupon, as said actuator member applies further force to said biasing member, a biasing force is stored in said biasing member, said stored biasing force biasing the scraper blade into continuing engagement with the conveyor belt as the scraper blade wears without any additional force being applied to said biasing member by said actuator member.

23. The tensioner arrangement of claim 22 including a cable having a first end attached to said mounting member and a second end attached to said first end of said actuator member.

24. The tensioner arrangement of claim 23 wherein said mounting member includes a pulley having a groove, said pulley adapted to be attached to the cross shaft for conjoint rotation therewith, said cable being located in said groove of said pulley.

25. The tensioner arrangement of claim 22 including a link having a first end attached to said mounting member and a second end attached to said first end of said biasing member.

26. The tensioner arrangement of claim 25 wherein said mounting member includes a plate adapted to be located generally transversely to the central axis and adapted to rotate about the central axis, said plate including a plurality of apertures, said first end of said link being attachable to said plate at a selected aperture.

27. The tensioner arrangement of claim 22 wherein said actuator member comprises a turnbuckle having a body, a first rod threadably attached to a first end of said body, and a second rod threadably attached to said second end of said body, said first rod adapted to be attached to said biasing member and said second rod adapted to be attached to the stationary member.

28. The tensioner arrangement of claim 22 wherein said biasing member includes a spring having a first end and a second end.

29. The tensioner arrangement of claim 28 wherein said biasing member includes a first drawbar having a first end located at said first end of said spring and a second end coupled to said second end of said spring, said first end of said drawbar being attached to said mounting member, and a second drawbar having a first end located at said second end of said spring and a second end coupled to said first end of said spring, said first end of said second drawbar being attached to said actuator member, whereby when said first end of said first drawbar is pulled away from said first end of said second drawbar said spring is compressed between said second ends of said first and second drawbars.

30. A cross shaft for a conveyor belt cleaner including:
   a scraper blade support member having a first end and a second end, and a central axis;
   a first mounting member attached to said first end of said support member, said first mounting member including a shaft located generally coaxial with said central axis, said shaft including a key;
   a second mounting member attached to said second end of said support member; and
   a stop member having an aperture through which said shaft is adapted to extend, said shaft being rotatable within said aperture with respect to said stop member, said stop member including a keyway in communication with said aperture, said keyway having a first stop wall and a second stop wall, said key being located in said keyway of said stop member;
   whereby said first and second mounting members enable said support member to rotate about said central axis between a first position wherein said key engages said first stop wall and a second position wherein said key engages said second stop wall.

31. The cross shaft of claim 30 wherein said shaft includes a plurality of bores extending generally diametrically through said shaft.

32. The cross shaft of claim 30 wherein said shaft of said first mounting member includes a plurality of spaced apart generally circular grooves that extend around said shaft.

33. The cross shaft of claim 22 including a retainer ring adapted to be selectively located in a groove of said shaft, said retainer ring adapted to limit longitudinal movement of said shaft.

34. A scraper blade for a conveyor belt cleaner having a cross shaft, said scraper blade including:
   a blade member including a front surface having a distal edge and a rear surface having a distal edge, said front surface including a plurality of wear indicia, each said wear indicia indicating a respective numerical volume of said scraper blade that remains to be worn away.

* * * * *